Oct. 25, 1949.   H. F. CLARK   2,486,004
PHASE REVERSAL PROTECTOR
Filed Oct. 24, 1945
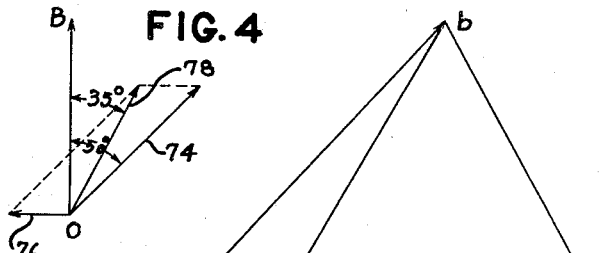
FIG. 4
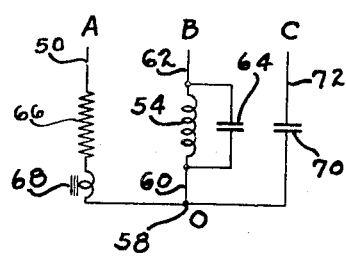
FIG. 2
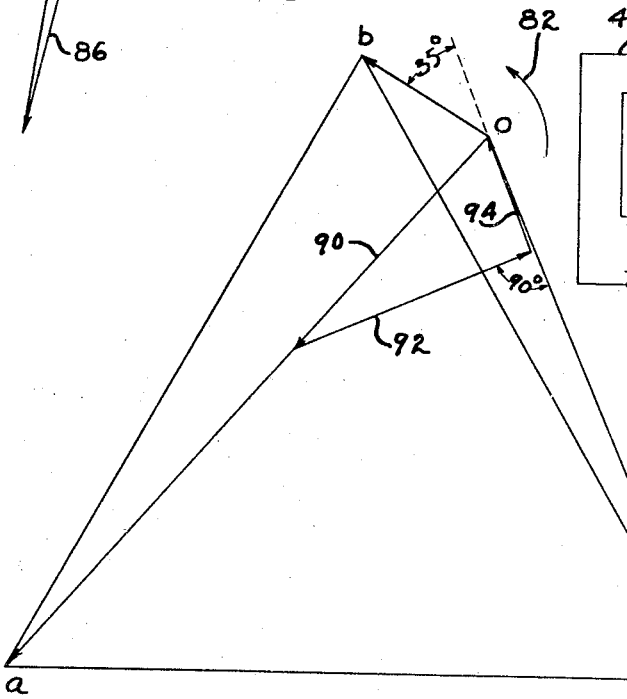
FIG. 3
FIG. 5
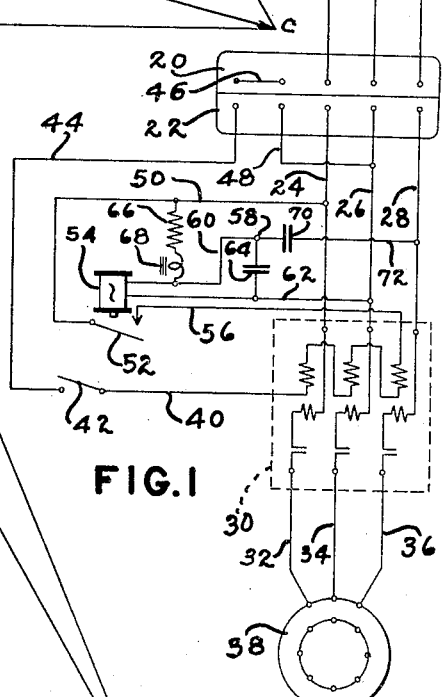
FIG. 1
INVENTOR.
Harry F. Clark
BY
Spencer Hardman and Fehr
Attorneys Patented Oct. 25, 1949

2,486,004

UNITED STATES PATENT OFFICE 2,486,004

PHASE REVERSAL PROTECTOR

Harry F. Clark, Oakwood, Ohio, assignor to General Motors Corporation, Dayton, Ohio, a corporation of Delaware Application October 24, 1945, Serial No. 624,171

2 Claims. (Cl. 175—294)

This invention relates to phase reversal protectors.

Commercial phase reversal protectors are of two general types. There is one type in which there is a rotary device like an electric motor which turns in opposite directions in accordance with the phase sequence to change or interrupt the connections of the circuit. There is a second type in which a double coil relay is used to change or interrupt the connections. One of the coils is connected in series with the capacitor means and the second coil is connected in series with a resistance to make the relay sensitive to conditions in phase sequence. While the second type is less expensive than the rotary type, a simpler and less expensive protector is desired.

It is an object of my invention to provide a simple inexpensive phase reversal protector in which an inexpensive commercial single coil relay can be used.

It is another object of my invention to provide a simple inexpensive phase reversal protector in which the inductance of a commercial single coil relay is reduced to a more desirable value by providing a capacitor means in parallel with it.

To attain these objects I have provided a commercial single coil relay which will cause the closing of the circuit to the device to be protected when the phase sequence is proper but which will open the circuit and prevent the reclosing when the phase sequence is improper.

A single coil relay forms one branch of a star connected arrangement in which a condenser is connected in series with the second leg of the star arrangement and a resistance is connected in series with the third leg. By providing proper values the relay will close on the correct phase sequence and remain open upon a power supply of incorrect phase sequence.

Further objects and advantages of the present invention will be apparent from the following description, reference being had to the accompanying drawings, wherein a preferred form of the present invention is clearly shown.

In the drawings:

Fig. 1 is a wiring diagram of a polyphase electrical system embodying one form of my invention;

Fig. 2 is a wiring diagram of the phase reversal protector;

Fig. 3 is a vector diagram for the currents and voltages upon a power supply of correct phase sequence;

Fig. 4 is a vector diagram of the currents and voltages in the leg of the star arrangement which includes the single coil relay; and Fig. 5 is a vector diagram of the currents and voltages upon a power supply of incorrect phase sequence.

Referring now more particularly to Fig. 1, there is shown a three-phase power supply having conductors A, B and C. These conductors connect to a receptacle 20. The receptacle 20 is adapted to receive the plug connector 22 to connect the supply conductors A, B and C with the conductors 24, 26 and 28 which connect with the magnetic contactor 30, shown diagrammatically. The magnetic contactor connects and disconnects the conductors 24, 26 and 28 from the conductors 32, 34 and 36 which connect directly to the three-phase electric motor 38 or some other electrical apparatus requiring polyphase current supply of the proper phase sequence. The magnetic contactor 30 is energized to close and deenergized to open by a control circuit. This control circuit includes the conductor 50 which connects the conductor 24 with the normally open contacts 52 of the standard commercial single coil relay 54, and the conductor 56 which connects with the operating coils of the magnetic contactor 30, the conductor 40 which connects to the manual switch 42, the conductor 44 which connects with the plug jumper 46, and the conductor 48 which connects to the conductor 26.

As is better shown in Fig. 2, the single coil relay 54 is located in one leg of a star connected arrangement. One end of the coil is connected by the conductor 60 to the common junction 58, while the other terminal of the relay 54 is connected by the conductor 62 to the conductor 26. To reduce the amount of inductance in this leg, a standard commercial capacitor 64 is connected in shunt circuit arrangement with the single coil relay 54 having a sufficient capacity to reduce the phase angle to 35 degrees lagging or less. For example, if an ordinary commercial single coil relay has a resistance of 533 ohms and an inductance of 650 ohms making a lag of 50° and an impedance of 846 ohms, a one microfarad condenser will reduce the lag to 35 degrees as shown in Fig. 4.

In Fig. 4 the line OB represents the voltage across the coil 54 while the arrow 74 indicates the current through the coil 54 lagging behind the voltage OB by 50 degrees. The arrow 76 shows the current through the capacitor 64 leading the voltage OB by 90 degrees. The arrow 78 indicates the resultant current in the leg OB which lags 35 degrees behind the voltage OB.

In the other leg of the star arrangement there is provided a standard commercial resistance 66 which may have inductance inherent in it or a separate reactance 68. The combination of the resistance and reactance should provide a current lag of 30 degrees or less. The resistance 66 is connected by the conductor 50 to the conductor 24 while the inductance 68 is connected by the conductor 60 to the junction 58. The inductance 68 may be omitted as in Figs. 3 and 5, if desired, to reduce the cost and promote simplicity.

In the third leg of the star arrangement, a second standard commercial capacitor 70 is provided which has a sufficiently large capacitor to carry the current required in this arrangement. It is connected directly to the junction 58 and by the conductor 72 to the conductor 28. Where the resistance 66 is about 2000 ohms and the impedance of the relay coil is 846 ohms, a capacity of 1.5 microfarads is sufficient.

In Figs. 3 and 5 the voltage between the supply conductors A and B is represented by the line *ab*, and the voltage between the supply conductors B and C is represented by the line *bc*, while the voltage between the supply conductors C and A is represented by the line *ac*. With the values of the star connection specified and with proper phase sequence, the point O representing the common junction 58 takes the position shown in Fig. 3, whereas with the power supply of improper sequence the point O takes the position shown in Fig. 5. Thus in both Figs. 3 and 5 the line *oa* designates the voltage drop across the resistance 66, while the line *ob* represents the voltage drop across the coil 54 and the capacitor 64, whereas the line *oc* represents the voltage drop across the capacitor 70.

The arrow 80 indicates the proper direction of phase sequence about the point O, the voltages building up in the sequence *oa-ob-oc-oa*, etc., while the arrow 82 in Fig. 5 indicates the improper direction of phase sequence with the voltages building up in the sequence *oa-oc-ob-oa*, etc. In Fig. 3 the arrow 84 indicates the current flowing through the resistance 66 which, since there is substantially no inductance in this leg, is directly in phase with the line *oa*. The arrow 86 represents the current through the capacitor 70 which leads the voltage line *oc* by an angle of 90 degrees. The resultant is indicated by the arrow 88 showing a current of .164 ampere at a voltage of 178 volts represented by the line *ob* in which the current lags 35 degrees behind the voltage.

In Fig. 5 the current through the resistance 66 is represented by the arrow 90 directly along the line *oa*, while the current through the capacitor 70 is indicated by the arrow 92 positioned at an angle of 90 degrees ahead of the voltage *oc*. The resultant is indicated by the arrow 94 representing a current of .045 ampere at 48 volts represented by the line *ob*. This current lags the voltage by 35 degrees.

Thus if the relay 54 is set to pick up and drop out between the values of 48 and 178 volts, and .045 and .164 ampere, the motor 38 will be protected against current supply of improper phase sequence.

It is not necessary to use the exact values set forth, but the protector has sufficient flexibility that standard commercial parts may be used. For example, if the resistance 66 has inductance added to it up to a limit of about 30° lagging, the value of the capacitor means 64 may be reduced. In general, the time-phase angles of the currents and corresponding voltages of the combined relay coil 54 and capacitor 64 should be between 0° and 35° lagging and that of the resistance 66 should be between 0° and 30° lagging.

While the form of embodiment of the invention as herein disclosed constitutes a preferred form, it is to be understood that other forms might be adopted, as may come within the scope of the claims which follow.

What is claimed is as follows:

1. A control system including apparatus capable of being properly operated by power derived from a polyphase electric current source of a certain phase sequence, an electrically operated switch means for controlling the polyphase energization of said apparatus, a polyphase electrical conducting system connected to said switch means, a single coil relay electrically connected to one of the conductors of the polyphase system and operatively connected to said switch means for operating said switch means to closed position upon said certain phase sequence and to open position on the reverse sequence, a first capacitor means connected in shunt circuit arrangement with said single coil relay, a second capacitor means connected to another conductor of the polyphase system, a resistance connected to a third conductor of said polyphase system, said single coil relay and said second capacitor means and said resistance being star connected together, said resistance and the entire circuit portion of which it forms a part from the star connection to the conductor of the polyphase system having no more than a negligible amount of inductive reactance.

2. A control system including apparatus capable of being properly operated by power derived from a polyphase electric current source of a certain phase sequence, an electrically operated switch means for controlling the polyphase energization of said apparatus, a polyphase electrical conducting system connected to said switch means, a single coil relay electrically connected to one of the conductors of the polyphase system and operatively connected to said switch means for operating said switch means to closed position upon said certain phase sequence and to open position on the reverse sequence, a first capacitor means connected in shunt circuit arrangement with said single coil relay, a second capacitor means connected to another conductor of the polyphase system, a resistance connected to a third conductor of said polyphase system, said single coil relay and said second capacitor means and said resistance being star connected together, said first capacitor means having a capacitance sufficient to keep the time-phase angle of the relay coil circuit between 0 and 35° lagging and said resistance and the entire circuit portion of which it forms a part from the star connection to the conductor of the polyphase system having no more than a negligible amount of inductive reactance.

HARRY F. CLARK.

REFERENCES CITED

The following references are of record in the file of this patent:

UNITED STATES PATENTS

| Number | Name | Date |
| --- | --- | --- |
| 512,340 | Tesla | Jan. 9, 1894 |
| 1,823,211 | Posselt | Sept. 15, 1931 |
| 1,826,099 | Stevens | Oct. 6, 1931 |
| 2,013,815 | Wensley | Sept. 10, 1935 |
| 2,074,454 | Brown et al. | Mar. 23, 1937 |

FOREIGN PATENTS

| Number | Country | Date |
| --- | --- | --- |
| 382,647 | Germany | Oct. 4, 1923 |
| 591,357 | Germany | Jan. 20, 1934 |